United States Patent [19]

Kubo et al.

[11] Patent Number: 5,012,188
[45] Date of Patent: Apr. 30, 1991

[54] VELOCITY DETECTOR FOR DETECTING VELOCITY FROM POSITION DETECTOR OUTPUTTING A PAIR OF ORTHOGONAL SIGNALS

[75] Inventors: Keishi Kubo, Moriguchi; Hiroyuki Nagano; Saburo Kubota, both of Katano, all of Japan

[73] Assignee: Matsushita Electric Industrial Co., Ltd., Osaka, Japan

[21] Appl. No.: 433,211

[22] Filed: Nov. 8, 1989

[30] Foreign Application Priority Data

Nov. 10, 1988 [JP] Japan ................................. 63-284522

[51] Int. Cl.$^5$ .......................... G01P 3/44; G01P 3/481; G01P 3/50
[52] U.S. Cl. ..................................... 324/160; 324/166; 364/565
[58] Field of Search ................ 324/160, 161, 163, 165, 324/166; 364/565; 318/779, 799

[56] References Cited

U.S. PATENT DOCUMENTS

| 4,560,927 | 12/1985 | Ishida et al. | 324/163 X |
| 4,587,485 | 5/1986 | Papiernik | 324/160 X |
| 4,839,834 | 6/1989 | Omae et al. | 324/166 X |
| 4,868,497 | 9/1989 | Wallrafen | 324/165 X |

FOREIGN PATENT DOCUMENTS

| 0148518 | 7/1985 | European Pat. Off. | 324/163 |
| 0006873 | 1/1985 | Japan | 324/163 |
| 1068815 | 1/1984 | U.S.S.R. | 324/163 |

*Primary Examiner*—Gerard R. Strecker
*Attorney, Agent, or Firm*—Wenderoth, Lind & Ponack

[57] ABSTRACT

A velocity signal is obtained by calculating both the selected signal of the differentiated signal of the position signal from a position detector and the selected signal of the sinusoidal wave signal according to position displacement, so that a velocity detection produces a smaller velocity detection error at a low velocity and generates no ripple component even when a high velocity is detected.

1 Claim, 3 Drawing Sheets

VELOCITY DETECTOR FOR DETECTING VELOCITY FROM POSITION DETECTOR OUTPUTTING A PAIR OF ORTHOGONAL SIGNALS

BACKGROUND OF THE INVENTION

The present invention relates to a velocity detector for detecting the rotational speed of a motor or the travel velocity of a moving element.

In a feedback control for positioning or locus control, a stable control requires not only the feedback of position but also the feedback of a velocity signal which is detected by using the signal from a positioning detector such as a rotary encoder or a linear encoder. Recently, in order to perform a highly accurate positioning and locus control, a highly accurate velocity detector has been increasingly required.

With reference to the drawings, an example of the prior art velocity detectors mentioned above is explained hereinafter.

FIG. 3 indicates the arrangement of a prior art velocity detector. In FIG. 3, the elements 100 and 101 are amplifiers for amplifying the signals from an encoder 1000 outputting sinusoidal waves according to the change in position; elements 102 and 104 are wave-form shaping circuits; elements 103 and 105 are differentiators; elements 106 and 107 are multipliers, and element 108 is an amplifier for adding together the signals from the multipliers 106 and 107 and for outputting them.

For the velocity detector arranged as shown above, the operation is explained hereinafter.

The sinusoidal wave signals obtained from the encoder 1000, which are different in phase by 90° from each other, are amplified by the amplifiers 100 and 101, and then are divided into two pairs of system signals, the first pair of which inputted through the waveform shapers 102 and 104 into the multipliers 106 and 107, respectively. The second system signal pair are obtained as an approximate velocity signals by differentiating the position signals from the encoder using the differentiators 103 and 105. In order to use a portion less affected with non-linearity of the velocity signals differentiated by the differentiators 103 and 105 and obtained as a differentiated signal, the second system signals are inputted reversely into the multipliers 106 and 107, changed in polarity according to travel direction by the output from the waveform shapers 102 and 104 previously inputted into the multipliers 106 and 107, and outputted as a velocity signal by adding together the outputs from the amplifiers 106 and 107 using the amplifier 108.

However, in the arrangement mentioned above, a velocity signal is approximately obtained by the differentiated signal of a position signal to accommodate switching, so that the velocity signal varies with the amplitude of the position signal and during high velocity travel, the velocity signal will contain a ripple component.

Also, when detecting a velocity during a short time region within the sinusoidal wave pitch of a position detector or when detecting a low velocity, the detection is affected by the amplitude of the position signal, causing an error of in the detected velocity.

SUMMARY OF THE INVENTION

Considering the problem mentioned above, the present invention provides a velocity detector which produces a smaller velocity detection error and generates no ripple component even when detector is detecting a high velocity.

In order to achieve the objective mentioned above, a velocity detector of the present invention comprises: a position detector for outputting two sinusoidal waves which are different in phase by 90° from each other according to position displacement; two converters for converting the signals from said position detector into electrical signals; two waveform shaping circuits for waveform shaping the signals from said converters; two differentiators for differentiating the signals from said converters; two multipliers for obtaining the product of the signal from said two waveform shaping circuits and the signal from said two differentiators; an adder for obtaining the sum of the signals from said two multipliers; two absolute-value detectors for obtaining the absolute value of the signals from said converters; an adder for obtaining the sum of the signals from said two absolute-value detectors, and a divider for obtaining the quotient of the signals from said two adders. Furthermore, said two multipliers may comprise an inverting amplifier, a waveform shaping circuit and a switch. Also, said absolute-value circuit may comprise an inverting amplifier, a waveform shaping circuit and a switch. Also, said divider may comprise a logarithmic calculator, a subtracter and a reverse logarithmic calculator or a combination of thereof.

Also, a velocity detector of the present invention comprises: a position detector for outputting two sinusoidal waves which are different in phase by 90° from each other according to position displacement; two converters for converting the signals; two amplifiers for inverting by 180° the phase of the signals from said converters; four differentiators for differentiating the signals from said two converters and the signals from said two amplifiers; a switch for outputting selectively the four signals from said four differentiators; a switch for fetching a specific signal from the four signals obtained from said two converters and said two amplifiers; a control circuit for controlling said two switches; a switch for fetching a specific signal from the four signals obtained from said switches, said two converters and said two amplifiers, and a divider for obtaining the quotient of the signals from the switches. Furthermore, said divider may comprise a logarithmic calculator, a subtracter and a reverse logarithmic calculator, or a combination thereof. Also, said control circuit may comprise two waveform shaping circuits and two inverting amplifiers.

The present invention, having the arrangement mentioned above, obtains a velocity signal by calculating both the selected signal of the differentiated signal of the position signal from the position detector and the selected signal of the sinusoidal wave signal obtained from position displacement, so that the present invention can eliminate the effect of the amplitude of the sinusoidal wave signal obtained from position displacement and the like, and can perform a highly accurate velocity detection to produce a less velocity detection error at a low velocity and to generate no ripple component even when the detector is detecting a high speed. Also, the present invention can perform a velocity detection without generating any pulse switching noise by using the absolute-value detector and the adder, or by allowing the switch to be actuated with a signal near OV and using the adder.

DETAILED DESCRIPTION OF THE INVENTION

With reference to drawings, a velocity detector in one embodiment according to the present invention is explained hereinafter.

Figure 1:
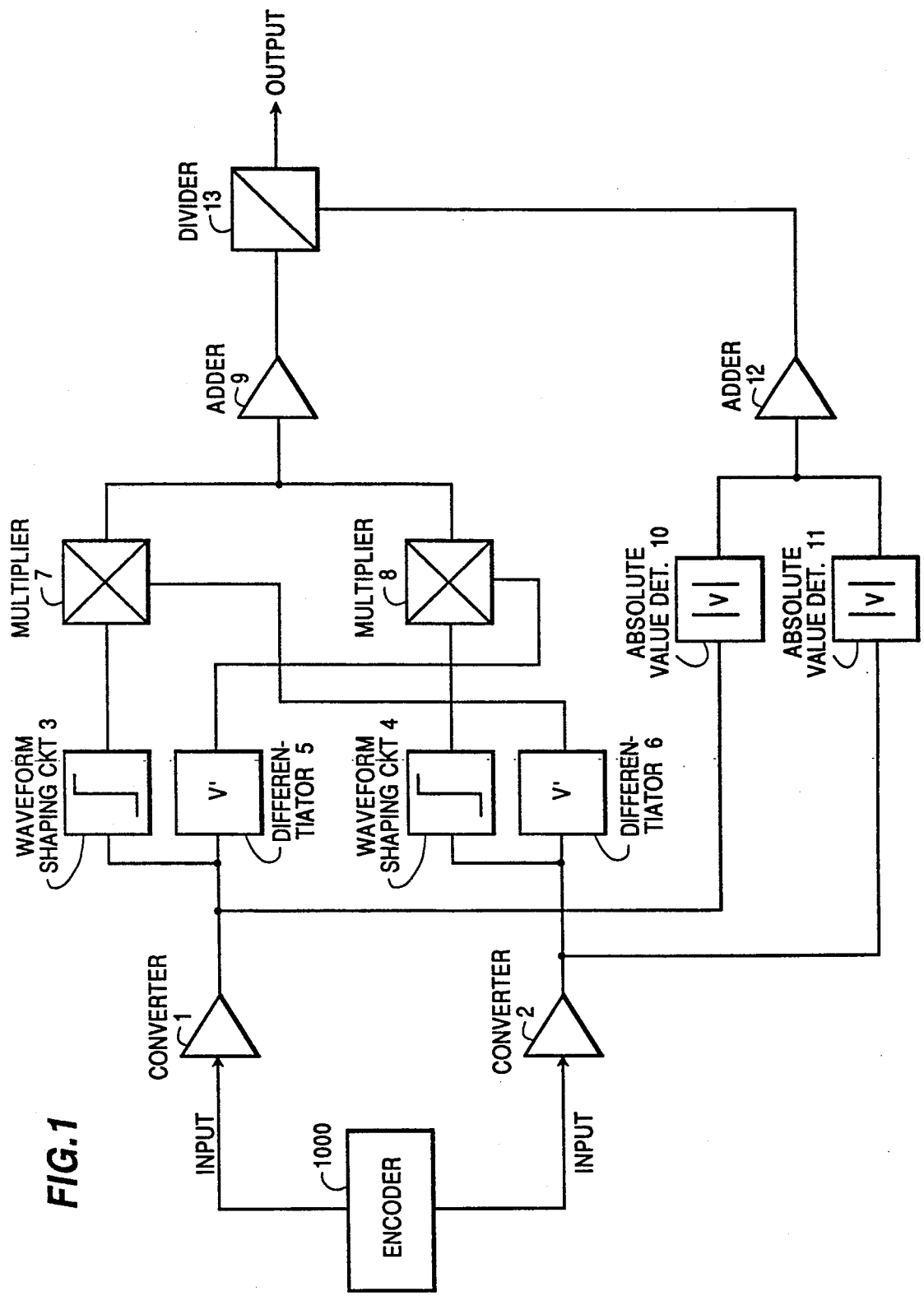
FIG. 1 is a schematic diagram showing the principle of operation for a velocity detector in the first embodiment according to the present invention.

FIG. 1 shows the entire arrangement of a velocity detector in the first embodiment according to the present invention. In FIG. 1, the elements 1 and 2 indicate converters for converting into electrical signals the signals from an encoder 1000 outputting sinusoidal waves which are different in phase by 90° from each other, elements 3 and 4 are waveform shaping circuits; elements 5 and 6 are differentiators; elements 7 and 8 are multipliers; elements 9 and 12 are adders; elements 10 and 11 are absolute-value detectors; and element 13 is a divider.

Using FIG. 1, the operation of the velocity detector arranged as indicated above is explained hereinafter.

The sinusoidal signals, which are different in phase by 90° from each other, from the encoder 1000 are converted into electrical signals by the converters 1 and 2. When the symbol X expresses position, the symbol $\lambda$ expresses one cycle of displacement of the encoder, and the symbol A expresses the amplitude of the sinusoidal wave according to position displacement, the converters are arranged such that the converter 1 outputs $A \sin(2\pi X/\lambda)$ and the converter 2 outputs $A \cos(2\pi X/\lambda)$.

Thereafter, the output from the converter 1 is inputted into the waveform shaper 3, the differentiator 5 and the absolute-value detector 10. The output from the converter 2 is inputted into the waveform shaper 4, the differentiator 6 and the absolute-value detector 11.

The waveform shaper 3 outputs a "−1" when the sinusoidal wave of the input signal is larger than "0", and outputs "1" when the sinusoidal wave is less than "0". The waveform shaper 4 outputs a "1" when the sinusoidal wave of the input signal is larger than "0", and outputs a "−1" when the sinusoidal wave is less than "0".

The differentiators 5 and 6 produce differentiated signals by differentiating by time the position signals from the converters 1 and 2. When the position X at a time T is taken as $X = X(T)$, the velocity V indicates that $V = dX(T)/dT$. When the notation mentioned above is used, the output from the differentiator 5 is $d(A \sin(2\pi X(T)/\lambda))/dT = d(2\pi X(T)/\lambda)/dT \cdot A \cos(2\pi X(T)/\lambda) = V A 2\pi/\lambda \cos(2\pi X(T)/\lambda)$, and the output from the differentiator 6 is $d(A \cos(2\pi X(T)/\lambda))/dT = -d(2\pi X(T)/\lambda)/dT \sin(2\pi X(T)/\lambda) = -V A 2\pi/\lambda \sin(2\pi X(T)/\lambda)$.

The absolute-value detectors 10 and 11 produce the absolute value of the position signals from the converters 1 and 2 such that the absolute-value detector 10 produces the value $|A \sin(2\pi X(T)/\lambda)|$, and the absolute-value detector 11 produces the value $|A \cos(2\pi X(T)/\lambda)|$.

The multiplier 7 calculates the product of the outputs from the waveform shaper 3 and the differentiator 6. The waveform shaper 3, as shown previously, outputs "−1" when $A \sin(2\pi X(T)/\lambda)$ is larger than "0", and outputs "1" when the value is less than "0", so that the product of said output and the output from the differentiator 6 being $-V A 2\pi/\lambda \sin(2\pi X(T)/\lambda)$ is $V A 2\pi/\lambda |\sin(2\pi X(T)/\lambda)|$. Similarly, the multiplier 8 produces the product of the outputs from the waveform shaper 4 and the differentiator 5. The waveform shaper 4, as shown previously, outputs "1" when $A \cos(2\pi X(T)/\lambda)$ is larger than "0", and outputs "−1" when the value is less than "0", so that the product of said output and the output from the differentiator 5 being $V A 2\pi/\lambda \cos(2\pi X(T)/\lambda)$ is $V A 2\pi/\lambda |\cos(2\pi X(T)/\lambda)|$.

The adder 9 calculates the sum of the outputs from said multipliers 7 and 8, and according to the results mentioned above, produces the sum $V A 2\pi/\lambda (|\sin(2\pi X(T)/\lambda)| + |\cos(2\pi X(T)/\lambda)|)$. The adder 12 calculates the sum of the outputs from said absolute-value detectors 10 and 11, and according to the results mentioned above, produces the sum $A (|\sin(2\pi X(T)/\lambda)| + |\cos(2\pi X(T)/\lambda)|)$.

The divider 13 calculates the quotient of the outputs from said adders 9 and 12, and according to the results mentioned above, the signal proportional to the velocity $V 2\pi/\lambda$ is detected.

In accordance with this embodiment as mentioned above, the signal proportional to velocity can be detected, so that the effect of the amplitude of the sinusoidal wave signal obtained from position displacement and the like can be eliminated, a highly accurate velocity detection to produce a smaller velocity detection error at a low velocity and to generate no ripple component even when a high velocity is detected can be performed, and a velocity detection without generating any pulse switching noise by using the absolute-value detector and the adder can be carried out.

Figure 2:
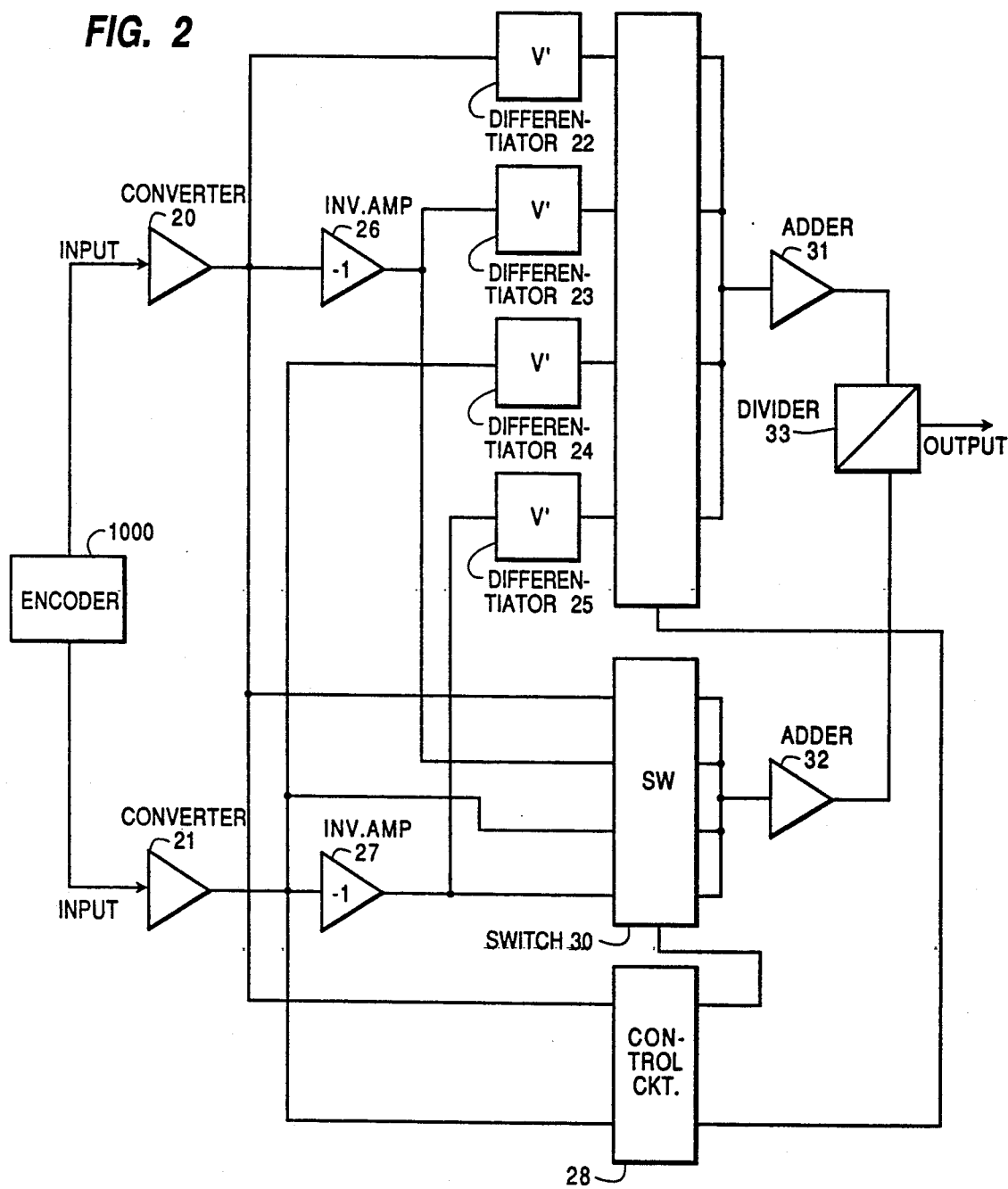
FIG. 2 is a schematic diagram showing the principle of operation for a velocity detector in the second embodiment according to the present invention.
Figure 3:
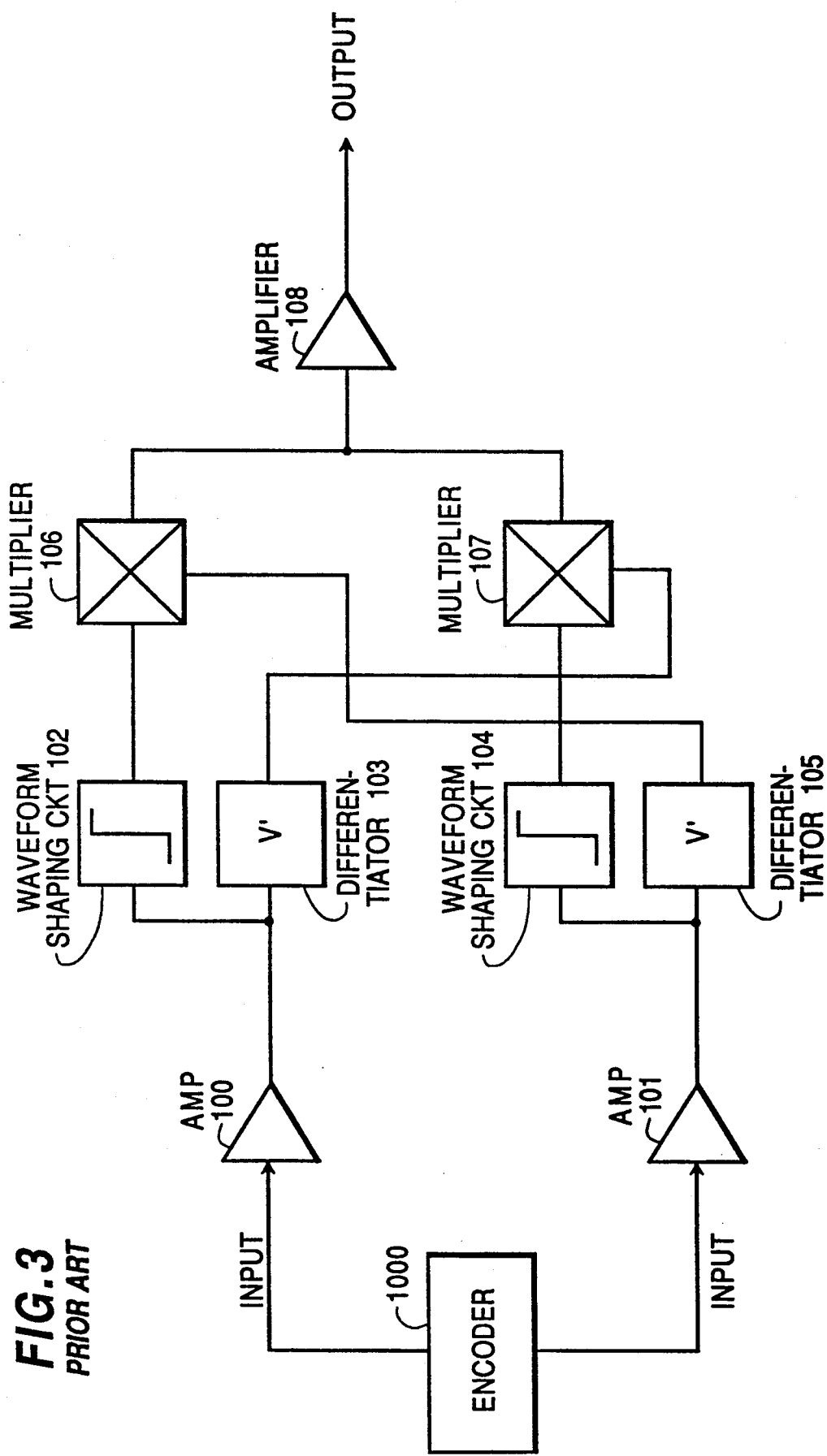
FIG. 3 is a schematic diagram showing the arrangement of a prior art velocity detector.

FIG. 2 shows the entire arrangement of a velocity detector in the second embodiment according to the present invention. In FIG. 2, elements 20 and 21 are converters for converting into electric signals the signals from an encoder 1000 outputting sinusoidal waves which are different in phase by 90° from each other; elements 22, 23, 24 and 25 are differentiators; elements 26 and 27 are inverting amplifiers; element 28 is a control circuit; elements 29 and 30 are switches; elements 31 and 32 are adders, and element 33 is a divider.

Using FIG. 2, the operation of the velocity detector arranged as indicated above is explained hereinafter.

The sinusoidal signals, which are different in phase by 90° from each other, from the encoder 1000 are converted into electrical signals by the converters 20 and 21, and when the symbol X expresses position, the symbol $\lambda$ expresses one cycle of the encoder, and the symbol A expresses the amplitude of the sinusoidal wave according to position displacement, the converters are arranged such that the converter 20 outputs $A \sin(2\pi X/\lambda)$ and the converter 21 outputs $A \cos(2\pi X/\lambda)$. Thereafter, the output from the converter 20 is inputted into the control circuit 28, the differentiator 22, the inverting amplifier 26 and the switch 30. The output from the converter 21 is inputted into the control circuit 28, the differentiator 24, the inverting amplifier 27 and the switch 30.

The output from the inverting amplifier 26 is inputted into the differentiator 23 and the switch 30. The output from the inverting amplifier 27 is inputted into the differentiator 25 and the switch 30.

The differentiators 22 and 24 produce differentiated signals by differentiating by time the position signals from the converters 20 and 21. When the position at a time T is taken as X=X (T), the velocity V indicates that V=dX (T)/dT. When the notation mentioned above is used, the output from the differentiator 22 is d (A sin $(2\pi X (T)/\lambda)$)—/dT=d $(2\pi x (T)/\lambda)$/dT A cos $(2\pi X (T)/\lambda)$=V A $2\pi/\lambda$ cos $(2\pi X (T)/\lambda)$, and the output from the differentiator 24 is d (A cos $(2\pi X (T)/\lambda)$)/dT=−d $(2\pi X (T)/\lambda)$/dT sin $(2\pi X (T)/\lambda$=−V A $2\pi/\lambda$ sin $(2\pi X (T)/\lambda)$. Also, the outputs from the differentiators 23 and 25, which are equal to inverted versions of the outputs from the differentiators 22 and 24, are −V A $2\pi/\lambda$ cos $(2\pi X (T)/\lambda)$ and V A $2\pi/\lambda$ sin $(2\pi X (T)/\lambda)$, respectively.

The switch 29, according to the control circuit 28, selects the output from the differentiator 25 when the output of the converter 20 is positive, and selects the output from the differentiator 24 when the output of the converter 20 is negative. Also, the switch 29 is arranged so as to select the output from the differentiator 23 when the output of the converter 21 is positive and to select the output from the differentiator 22 when the output of the converter 21 is negative. The outputs from the differentiators 22, 23 24 and 25 are switched by the switch 29 and inputted into the adder 31, with the result that the adder 31 outputs a value V A $2\pi/\lambda$ ($|\sin (2\pi X (T)/\lambda)| + |\cos (2\pi X (T)/\lambda)|$).

The switch 30, according to the control circuit 28, selects the output from the inverting amplifier 27 when the output of the converter 20 is positive, and selects the output from the converter 21 when the output of the converter 20 is negative. Also, the switch 30 is arranged so as to select the output from the inverting amplifier 26 when the output of the converter 21 is positive and to select the output from the converter 20 when the output of the converter 21 is negative. The output from the switch 30 is inputted into the adder 32, with result that the adder 32 outputs a value A ($|\sin (2\pi X (T)/\lambda)| + |\cos (2\pi X (T)/\lambda)|$).

The divider 33 calculates the quotient of the outputs from said adders 31 and 32, and according to the results mentioned above, the signal proportional to V 2 $\pi/\lambda$ or the velocity is detected.

In accordance with the embodiment as mentioned above, the signal proportional to the velocity can be detected, so that the effect of the amplitude of the sinusoidal wave signal obtained from the position displacement and the like can be eliminated, a highly accurate velocity detection produces a smaller velocity detection error at a low velocity and generates no ripple component even when a high velocity is detected and a velocity detection without generating any pulse switching noise by allowing the switch to be actuated with a signal near 0V and using the adder can be carried out.

The present invention can be arranged in various modes in addition to those shown in the embodiments mentioned above.

Further, in the embodiment, the multiplier may be arranged by combining an inverting amplifier with a switch.

In the first embodiment, the absolute-value detector may be arranged by combining a waveform shaper with a switch.

In the second embodiment, although the control circuit 28 is arranged such that two of four inputs of the switches 29 and 30 are selected at all times according to the change in $\pi$ phase of the converters 20 and 21, the control circuit 28 may be arranged such that any one of four inputs of the switches 29 and 30 is selected according to the change in $\pi/2$ phase of the converters 20 and 21.

In the first and second embodiments, although an encoder for outputting sinusoidal wave signals is used, any encoder for outputting approximate sinusoidal wave signals or approximate triangular wave signals may be used for the arrangement.

As previously mentioned, the present invention obtains a velocity signal by calculating both the selected signal of the differentiated signal of the position signal from the position detector and the selected signal of the sinusoidal wave signal obtained from position displacement, so that the present invention can eliminate the effect of the amplitude of the sinusoidal wave signal obtained from position displacement and the like, and can perform a highly accurate velocity detection to produce a lower velocity detection error at a low speed, and to generate no ripple component even when detecting a high speed, and to generate no switching noise.

What is claimed is:

1. A velocity detector for obtaining the velocity based on first and second sinusoidal signals output from a position detector, said sinusoidal signals differing in phase by 90° from each other according to position displacement, said velocity detector comprising:

first and second converters for respectively receiving and converting the first and second signals output from the position detector into first and second respective electrical signals;

first and second waveform shaping circuits for respectively receiving and waveform shaping said first and second electrical signals from said first and second converters and for providing respective outputs therefrom;

first and second differentiators for respectively receiving and differentiating said first and second electrical signal output from said first and second converters and for providing respective outputs therefrom;

first and second multipliers for obtaining the product of the signals from said first and second waveform shaping circuits and said first and second differentiators, said first multiplier multiplying said output of said first waveform shaping circuit and said second differentiator and said second multiplier multiplying the output of said first differentiator and second waveform shaping circuit;

a first adder for receiving outputs of said first and second multipliers and for providing an output corresponding to the sum thereof;

first and second absolute value detectors for respectively receiving said two signals output from said first and second converters and for providing respective outputs therefrom which correspond to the absolute value of the signals input thereto;

a second adder for receiving said outputs of said first and second absolute value detectors and for providing an output corresponding to the sum thereof;

a divider for receiving said output signals from said first and second adders and for providing an output corresponding to the quotient of said outputs of said first and second adders, said output corresponding to the detected velocity.

* * * * *